(12) United States Patent
Siedentop et al.

(10) Patent No.: US 6,329,909 B1
(45) Date of Patent: Dec. 11, 2001

(54) CODE SIGNAL GENERATOR, IN PARTICULAR FOR AN ANTI-THEFT PROTECTION SYSTEM OF A MOTOR VEHICLE

(75) Inventors: Michael Siedentop, Neutraubling; Ulrich Schrey, Laaber Ot Waldetzenberg, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/370,250

(22) Filed: Aug. 9, 1999

Related U.S. Application Data

(63) Continuation of application No. PCT/EP98/00059, filed on Jan. 7, 1998.

(30) Foreign Application Priority Data

Feb. 7, 1997 (DE) .................................................. 97102010

(51) Int. Cl.[7] .................................................. B60Q 25/10
(52) U.S. Cl. ................. 340/426; 340/425.5; 340/825.69; 307/10.2
(58) Field of Search ................. 340/426, 425.5, 340/825.69, 825.72, 825.34; 307/10.1, 10.2, 10.5, 10.4

(56) References Cited

U.S. PATENT DOCUMENTS 5,552,641 * 9/1996 Fischer et al. ....................... 307/10.5
5,723,911 * 3/1998 Glehr ..................................... 307/10.2

FOREIGN PATENT DOCUMENTS 44 03 655 A1  8/1995 (DE).
0 659 963 A1  6/1995 (EP).

OTHER PUBLICATIONS

German Utility Model G 94 12 718.2, dated Jan. 19, 1995, electronic locking system.
International Application WO 96/17290 (Kiper), dated Jun. 6, 1996.

* cited by examiner

*Primary Examiner*—Donnie L. Crosland
(74) *Attorney, Agent, or Firm*—Herbert L. Lerner; Laurence A. Greenberg; Werner H. Stemer

(57) ABSTRACT

A code signal generator has a transponder unit, which proves its authorization for releasing an immobilizer by means of a question-response dialog. The code signal generator has a remote control unit which transmits control signals for unlocking doors upon the actuation of a pushbutton. Both the transponder unit and the remote control unit have a single encryption unit, which is accessed by both units in order to encrypt the signals to be transmitted.

12 Claims, 2 Drawing Sheets

CODE SIGNAL GENERATOR, IN PARTICULAR FOR AN ANTI-THEFT PROTECTION SYSTEM OF A MOTOR VEHICLE

CROSS REFERENCE TO RELATED APPLICATIONS

This is a continuation of copending international application PCT/EP98/00059, filed Jan. 7, 1998, which designated the United States.

BACKGROUND OF THE INVENTION

Field of the Invention

The invention relates to a code signal generator, in particular for an anti-theft protection system of a motor vehicle.

A prior art code signal generator (European Patent Application EP 0 659 963 A1) has a transponder unit, which receives a question code signal from a transmitting and receiving (transceiver) unit disposed in the motor vehicle. In response, a response code signal is generated in the code signal generator with the aid of the question code signal and transmitted back to the transmitting and receiving unit in the motor vehicle. In the event of authorization of the response code signal (authentication) an immobilizer of the motor vehicle is released.

In addition, the code signal generator has a remote control unit, which is independent of the transponder unit, generates a coded control signal after the actuation of a pushbutton switch and transmits the signal via an antenna. A receiving unit in the motor vehicle receives the coded control signal and controls the central locking system if the control signal is authorized.

In this case, the transponder unit and the remote control unit are arranged independently of one another on a key grip. Each unit has a computing unit which respectively generates is the response code signal and the control signal.

A further known code signal generator (International Application WO 96/17290) has either a transponder unit or a remote control unit. Only the remote control unit is required in the event of unidirectional signal transmission, and only the transponder unit in the event of bidirectional signal transmission. To make it more difficult to intercept the transmitted signals, the same signal is transmitted via at least two different transmission channels. The code signal generator therefore has two different transmitters. The two received signals must be correct in order to enable a security unit to be controlled.

SUMMARY OF THE INVENTION

It is accordingly an object of the invention to provide a code signal generator, which overcomes the above-mentioned disadvantages of the heretofore-known devices and methods of this general type and which has as few components as possible yet permits authentication which is interception-proof and falsification-proof.

With the foregoing and other objects in view there is provided, in accordance with the invention, a code signal generator for triggering a security unit, particularly in a motor vehicle, comprising:

a transponder unit adapted to receive a question code signal from a stationary transmitting and receiving unit, to generate, in response, a response code signal based on the question code signal, and to transmit the response code signal to the transmitting and receiving unit for authentication, whereby a security unit is enabled upon a successful authentication;

transmitting unit independent of the transponder unit, the transmitting unit having a switching element, and being adapted to wirelessly transmit a control signal to the stationary transmitting and receiving unit upon actuation by the switching element and, upon authorization, to remotely control other controllers; and a single signal generating unit accessible by the transmitting unit and by the transponder unit for generating the control signal and the response code signal.

In other words, the code signal generator has a single encryption unit which is accessed both by a remote control unit and by a transponder unit. Consequently, a coded control signal and an response code signal are respectively generated by the encryption unit and transmitted.

It is particularly advantageous if the transponder unit, the remote control unit and the encryption unit are disposed as a circuit in an integrated manner on a semiconductor chip. The code signal generator has only small dimensions as a result of this. The code signal generator may have a resonant circuit with a coil and a capacitor, by means of which signals are transmitted or received inductively. At the same time, it also has one or more transmitters by means of which the coded control signal is transmitted in a wireless fashion.

The code signal generator may have an energy store which is charged by wirelessly received energy signals. Consequently, the code signal generator does not require any battery that has to be repeatedly replaced as soon as its capacity has been exhausted.

In accordance with an added feature of the invention, a control unit controls the transponder unit and the transmitting unit in dependence on a received question code signal and the actuation of the switching element, respectively.

In accordance with an additional feature of the invention, the transponder unit, the transmitting unit and the signal generating unit are circuits commonly integrated on a semiconductor chip.

In accordance with another feature of the invention, the transponder unit includes a resonant circuit with a coil and a capacitor for inductively transmitting the response code signal and inductively receiving the question code signal.

In accordance with a further feature of the invention, the transmitting unit includes a modulator and a radio antenna for transmitting the control signal coming from the modulator and an RF oscillator.

In accordance with again an added feature of the invention, the transmitting unit has an optical transmitter for optically transmitting the control signal.

In accordance with again an additional feature of the invention, the code signal generator includes a memory unit connected to the transponder unit, the memory unit being enabled for data to be written but disabled for data to be read from externally of the code signal generator.

In accordance with again another feature of the invention, synchronization data are stored in the memory unit, and the synchronization data are fed to the signal generating unit for generating one of the response code signal and the control signal, the synchronization data in the question code signal being transmitted to the code signal generator, and overwriting previously stored synchronization data.

In accordance with again a further feature of the invention, a clock recovery unit is provided for recovering a clock signal for the control unit from the received question code signal.

In accordance with a concomitant feature of the invention, the stationary transmitting and receiving unit is integrated in a motor vehicle anti-theft protection system, and the security unit is an immobilizer of the motor vehicle. More specifically, with the above and other objects in view there is provided, in accordance with the invention, an anti-theft protection system of a motor vehicle, comprising:

a transmitting and receiving unit stationary in a motor vehicle;

a code signal generator for triggering a security unit of the anti-theft protection system, the code signal generator including a transponder unit adapted to receive a question code signal from the stationary transmitting and receiving unit, to generate, in response, a response code signal based on the question code signal according to a given algorithm, and to transmit the response code signal to the transmitting and receiving unit for authentication;

a transmitting unit independent of the transponder unit, the transmitting unit having a switching element, and being adapted to wirelessly transmit a control signal to the transmitting and receiving unit upon actuation by the switching element; and the transmitting and receiving unit having a signal generating unit generating a desired code signal according to the given algorithm, wherein one of the received response code signal and the received control signal are compared with the desired code signal and wherein, if the response code signal or the control signal corresponds with the desired code signal at least to a large extent, an enable signal is generated for controlling a security unit in the motor vehicle.

Other features which are considered as characteristic for the invention are set forth in the appended claims.

Although the invention is illustrated and described herein as embodied in a code signal generator for an anti-theft protection system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
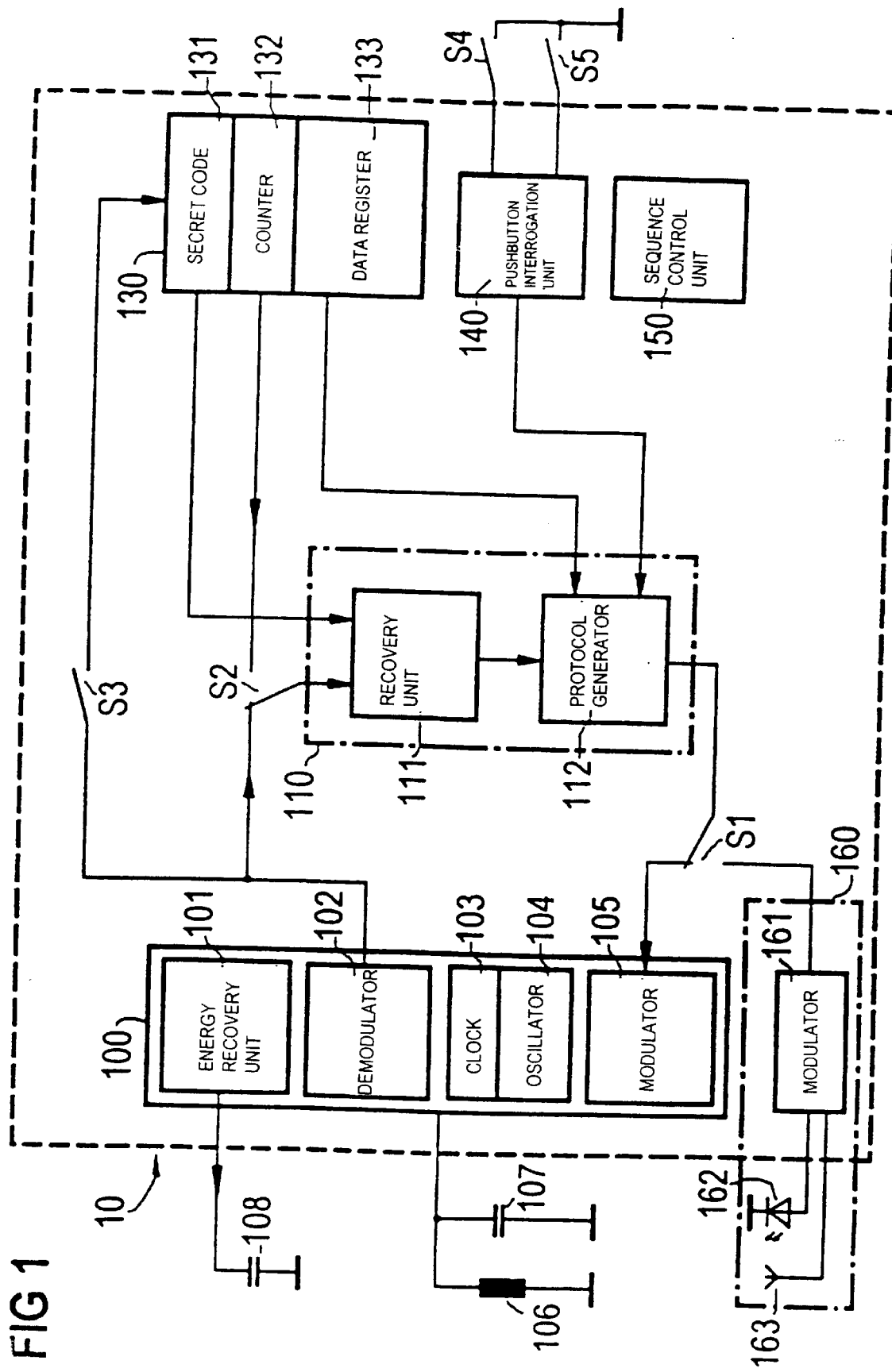
FIG. 1 is a schematic block diagram of a code signal generator according to the invention.
Figure 2:
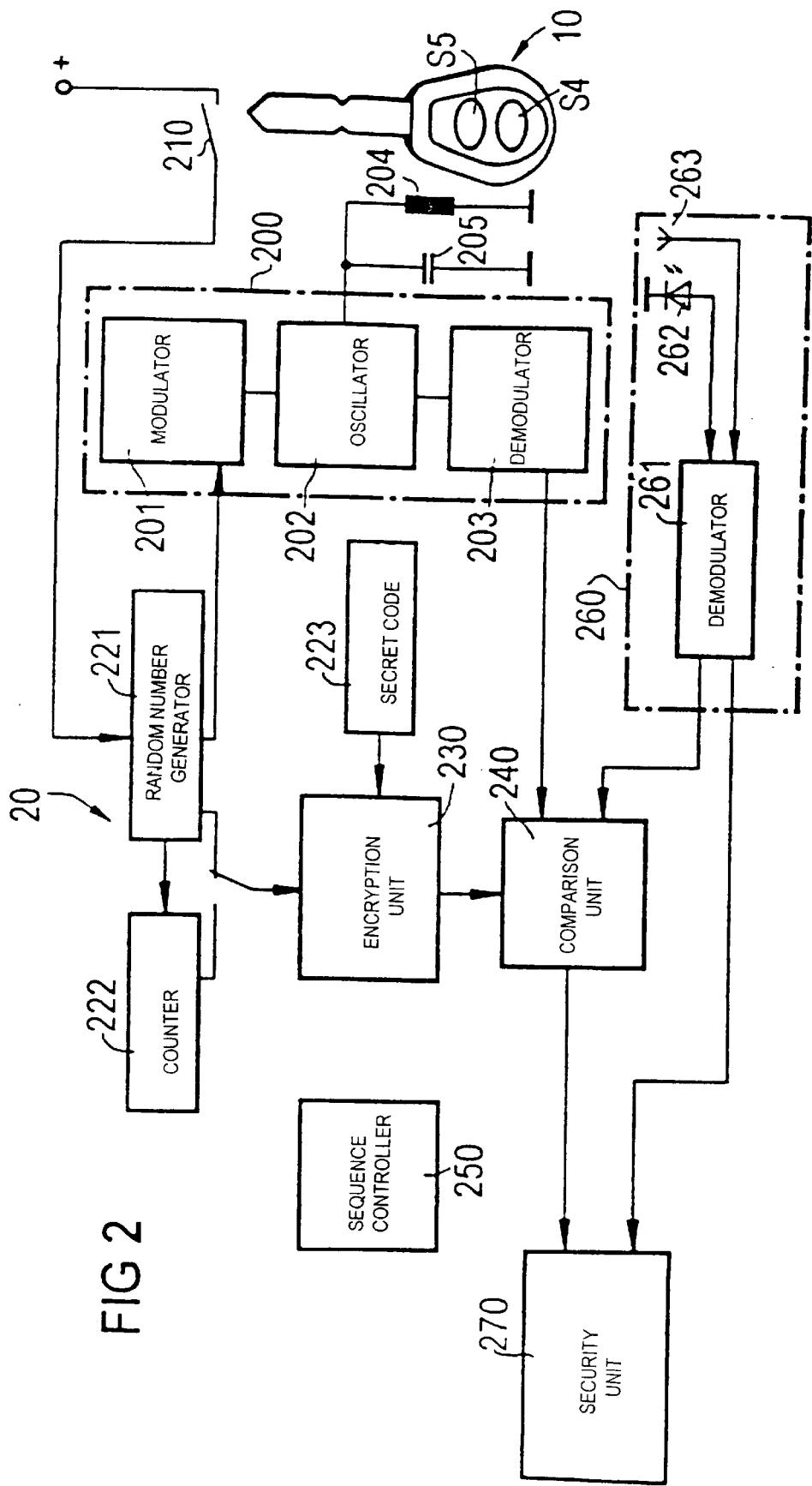
FIG. 2 is a schematic block diagram of a transmitting and receiving unit in a motor vehicle.

Referring now to the figures of the drawing in detail and first, particularly, to FIG. 1 thereof, there is seen a portable code signal generator 10 according to the invention. The generator 10 includes a transponder unit 100, 111, 112 and 130 and a remote control unit 140, 160, S4 and S5. The code signal generator 10 communicates with a stationary transmitting and receiving unit 20, illustrated in FIG. 2, by transmitting and/or receiving code signals. Authentication is performed with the aid of the code signal generator 10. A security unit 270 is driven by an enable signal if the authentication proceeds successfully.

The transponder unit of the code signal generator 10 has, as the transmitting and receiving element, a resonant circuit 106, 107 with a coil 106 and a capacitor 107. By means of the resonant circuit 106, 107, signals are received or transmitted inductively by means of a radio-frequency magnetic field. For this purpose, the transponder unit has an inductive interface 100 with a demodulator 102, which demodulates a received signal and converts it into a serial data signal for further processing. Analogously to the demodulator 102, the inductive interface 100 has a modulator 105, which modulates a signal to be transmitted with a carrier frequency and transmits it via the resonant circuit 106, 107.

Moreover, the inductive interface 100 may have an energy recovery unit 101 with a rectifier and a voltage monitor, by means of which energy can be drawn from a received signal should the need arise. With the energy that has been drawn, the components of the code signal generator 10 can be supplied directly with energy.

The energy can additionally be used to charge a rechargeable energy store 108 (for example in the form of a capacitor or accumulator). Instead of the energy store 108, it is also possible to use a battery as an energy store, in which case the battery must then be replaced as soon as it is discharged.

The charge state of the energy store 108 or of the battery can be continually monitored by the voltage monitoring arrangement, in order that, if required, it is immediately possible for energy to be recharged or for attention to be is drawn to the empty battery. In addition, the voltage monitoring arrangement monitors the operating voltage on the code signal generator 10, in order to prevent any faults on account of voltage dips.

The remote control unit of the code signal generator 10 has one or more pushbutton switches S4 and S5, which are actuated by a user when the latter wishes to remotely control an electronic device (referred to as security unit below). A pushbutton interrogation unit 140 identifies whether and which pushbutton switch S4 or S5 has been actuated. Furthermore, the remote control unit has a transmitter 160 with radio antennas 163 or optical/acoustic transmitting elements 162, upstream of which, if appropriate, a modulator 161 with an RF oscillator connected downstream or a corresponding signal transducer can be connected.

When a pushbutton switch S4 or S5 is actuated, the remote control unit is activated as soon as the pushbutton interrogation unit 140 recognizes that a pushbutton switch S4 or S5 has been actuated. In response to this, in a protocol generator 112 of a signal generating unit 110, a coded control signal is generated which is transmitted via the transmitter 160 in a wire-free manner.

The control signal has a control information item which represents the pushbutton switch S4 or S5 which has been actuated, that is to say what is to be remotely controlled. Moreover, the protocol generator 112 adds an encrypted, binary signal (referred to as code word below), which is generated in an encryption unit 111 of the signal generating unit 110, to the control signal.

The encryption unit 111 is connected to a memory or store 130. The memory 130 is in this case divided into a secret code memory 131, in which a secret key (referred to as secret code below) is stored, into a counter 132, in which synchronization data are stored, and into a data register 133, in which user-specific or vehicle-specific data are stored. The synchronization data and the secret code are fed to the encryption unit 111. These are encrypted by means of an encryption algorithm in the encryption unit 111 and added as code word to the control signal.

The encryption unit 111 serves for encrypting data. This encryption unit 111 is accessed both by the transponder unit and by the remote control unit, in order in each case to encrypt the response code signal and the control signal, respectively, or in order to add at least a code word to the signals.

Encrypted signals have the advantage that the encryption algorithm cannot be inferred from one or a plurality of intercepted signals, or can be so inferred only with a very high outlay. In the case of each transmission operation, a different signal is generated and transmitted, cyclically, with the result that once a signal has been intercepted, it cannot subsequently be used any longer for authentication since now it is no longer authorized.

The memory 130 is designed in such a way that the secret code can be overwritten only when authorization has been proved. The secret code cannot be read out externally. The synchronization data are stored in the counter 132 of the memory 130 and, if required, can be altered (altering the stored content=altering the counter reading) or be overwritten by new synchronization data.

A sequence control unit 150 is arranged on the code signal generator 10 and controls all the components of the code signal generator 10 (inductive interface 100, memory 130, transmitter 160, protocol generator 112, etc.). It is, therefore, electrically connected to all of the components (for the sake of clarity, the electrical connections are not illustrated in the drawing).

The sequence control unit 150 also drives switches S1 to S3. Different operations proceed on the code signal generator 10 depending on the switch position of the switches S1 to S3. The switch S1 connects the output of the protocol generator 112 either to the input of the modulator 105 (response code signal) of the inductive interface 100 or to the transmitter 160 (control signal). The switch S2 feeds to the encryption unit 111 either the received, demodulated question code signal, or the stored contents of the counter 132. The switch S3 is closed only when data are intended to be written to the memory 130. The switch S3 can be automatically closed when a question code signal is received. However, it may also be necessary to prove authorization (is communicated to the sequence control unit 150 by the question code signal) in order to close the switch S3 and in order thus to be able to overwrite the secret code or the synchronization data.

The sequence control unit 150 is clocked by an oscillator 104 or a clock recovery unit 103. If only the remote control unit is activated, then first of all the oscillator 104 is activated, which then clocks the sequence control unit 150. If, on the other hand, the transponder unit is activated by the reception of a question code signal, then the clock signal for the sequence control unit 150 is taken from the alternating magnetic field—received by the transponder unit—by the clock recovery unit 103.

It is advantageous for such a code signal generator 10 to be used for an anti-theft protection system of a motor vehicle.

In this case, the user carries the code signal generator 10. The code signal generator 10 then communicates with a transmitting and receiving unit 20 (cf. FIG. 2), which is stationary in the motor vehicle.

Referring specifically to claim 2, the anti-theft protection system comprises an immobilizer as the security unit 270, whereby the immobilizer first has to be released by proof of authorization before the vehicle can be used. The code signal generator 10 can additionally be used to remotely control further security units 270, such as a central locking system which locks or unlocks door locks of the motor vehicle.

Furthermore, it is also possible for other controllers to be controlled in a remotely controlled manner as security units 70, by means of which functions such as opening/closing of windows, setting of the seats, switching-on/off of the heating, etc., are controlled.

If a user wishes to enter the vehicle, then first of all he or she actuates a pushbutton switch S4 or S5 on the code signal generator 10, to be precise the one which instructs the central locking system of the motor vehicle to unlock all the doors and, if appropriate, the luggage compartment.

It shall be assumed here that the pushbutton switch S4 is provided for the purpose of unlocking all the doors and the pushbutton switch S5 is provided for the purpose of locking all the doors. As soon as the actuation of the pushbutton switch S4 is identified by the pushbutton interrogation unit 140, a control signal is generated in the protocol generator 112. For this purpose, the code word is joined together, by the encryption unit 111, with a control information item (referred to as control data below) and, if appropriate, with data from the data register 133 (referred to as vehicle data below) by means of coding. The control signal thus generated is then transmitted to the motor vehicle after having been modulated, or else in unmodulated form.

A receiver 260 of the transmitting and receiving unit 20 in the motor vehicle receives the control signal via an optical or acoustic receiving element 262 or by means of a radio antenna 263 and demodulates the control signal in a demodulator 261. The demodulator 261 separates the control signal into its constituent parts of code word—control data—vehicle data. The code word is fed to a comparison unit 240 and the remaining data are fed to the security unit 270.

Firstly, authentication is performed using the received code word. For this purpose, the code word is compared with an expected desired code word in the comparator 240. If the authentication has been successful, then an enable signal is generated by means of which the contents of the control data and, if appropriate, of the vehicle data are executed by the security unit 270. The content of the control data specifies which device in the motor vehicle is to be controlled. In the case where the pushbutton switch S4 is actuated, the intention is for all the doors and the luggage compartment of the motor vehicle to be unlocked.

If the user wishes to drive away in his motor vehicle, then it is first necessary to release the immobilizer. For this purpose, the user actuates an ignition switch 210, for example by turning the ignition key in the ignition lock into the position "ignition ON" or "START." In response to this, the transmitting and receiving unit 20 in the motor vehicle transmits a binary question code signal (also referred to as challenge or interrogation signal) via an inductive interface 200 and a resonant circuit 204, 205 with a coil 204 and a capacitor 205. In this case, the question code signal may be transmitted either after having been encrypted beforehand or, alternatively, as an unencrypted and also noncoded signal.

The question code signal preferably contains the synchronization data, in particular a random number.

The transponder unit of the code signal generator 10 receives the question code signal. The question code signal is evaluated. If the question code signal was an allowed question code signal, then a code word is generated in the encryption unit 111 with the aid of the secret code. The code word is then completed by the protocol generator 112 to form a binary, encrypted response code signal (also referred to as response). The response code signal is transmitted via the resonant circuit 106, 107 of the code signal generator 10 to the resonant circuit 204, 205 of the transmitting and receiving unit 20 in the motor vehicle.

The response code signal is demodulated with the aid of a demodulator 203 of the inductive interface 200 of the transmitting and receiving unit 20 and fed to the comparison unit 240.

In the meantime, a desired code word is generated in an encryption unit 230 of the transmitting and receiving unit 20. For this purpose, both a secret code from a secret code memory 223 and the synchronization data (random number) generated in a random number generator 221 are fed to the encryption unit 230. The secret code should thereby be identical to the secret code of the code signal generator 10. The same random number is used as the synchronization datum, since the random number has been transmitted with the question code signal to the code signal generator 10.

The received response code signal is compared with the desired code word. If the two code signals correspond at least to a large extent, then it is assumed that the code signal generator 10 belongs to the anti-theft protection system and is authorized, since the two secret codes turn out to be identical in this case. Authentication is thus successful. The immobilizer is consequently released.

Identical secret codes are used to generate the code signals both in the code signal generator 10 and in the transmitting and receiving unit 20 of the motor vehicle. The secret code may be a binary number to which a mathematical encryption algorithm (logical operation such as, by way of example, an EXOR linking of two binary numbers) is applied. The random number is likewise used for generating the desired code word.

The encryption algorithm may be designed in such a way that the code signals change cyclically, with the result that each time a code signal is generated, a code signal that has changed relative to the immediately preceding code signal is generated.

The length of a cycle (i.e., the possible repeatability of a code signal once transmitted) in this case depends on the encryption algorithm and the data (random number) used for the encryption. Thus, by way of example, the secret code may have a length of 128 bits and the synchronization data 32 bits. As a result, it is possible to generate so many different code signals that the outlay required to intercept the transmitted code signal and to consecutively try all of the possibilities in order to arrive at the secret code becomes unviable. Consequently, a repetition of a code signal once transmitted does not, as a rule, occur when the code signal generator 10 is used in an anti-theft protection system. The cycle length can be increased still further by longer synchronization data or secret codes. This is because the more bit positions the random number has, the more complex and more reliable the anti-theft protection system becomes.

It is advantageous if the synchronization data contains a binary random number which is randomly generated anew by a random number generator 211 each time the ignition switch 210 is actuated. This random number is also stored as the start value in a counter 222. The random number can be transmitted as the question code signal immediately after the modulation. It is also possible for the random number to be encrypted in the encryption unit 230 and subsequently to be transmitted in modulated form.

The random number received by the code signal generator 10 is stored there in the counter 132 (a random number already stored earlier is then overwritten). The random number and the secret code of the code signal generator 10 are encrypted according to the predetermined encryption algorithm in the encryption unit. The code word is thus generated.

It is preferable for no dialog with the transmitting and receiving unit 20 to take place when the control signal is generated, that is to say no question code signal is received. The previous synchronization data (random number) therefore remain valid. To ensure that even when the control signal is generated, an altered control signal relative to the preceding control signal is transmitted, the synchronization data are altered by the counter 132 proceeding from the start value (=random number) by incrementing or decrementing each time the pushbutton switch S4 or S5 is actuated. The counter reading thus obtained is then used to generate the code word for the control signal.

The transmitting and receiving unit 20 in the motor vehicle is constructed similarly to the code signal generator 10. It, too, contains the encryption unit 230, which likewise generates a code word, to be precise the desired code word. The synchronization data come from the random number generator 221 in the event of a question-answer dialog (i.e., transmission of the question code signal and reception of the response code signal). If no question code signal has been transmitted immediately beforehand, then the synchronization data come from the counter 222. When a code signal is received, the synchronization data are used to generate the desired code word by encryption. The sequence controller 250 switches back and forth between the random number generator 221 and the counter 222, as required.

During the question-answer dialog, the same random number is taken as a starting point both in the transmitting and receiving unit 20 and in the code signal generator 10, since the random number is transmitted to the code signal generator 10 and likewise stored there. Consequently, the anti-theft protection system runs "synchronously".

When the control signal is generated in the code signal generator 10, the synchronization data, that is to say the random number (=counter reading), are altered by the counter 132, by being incremented or decremented, since a pushbutton switch S4 or S5 has been actuated. The synchronization data in the transmitting and receiving unit 20, on the other hand, initially remain unchanged since the actuation of the pushbutton switch S4 or S5 of the code signal generator 10 is not registered there. This is also the case if somebody plays with the code signal generator 10 and repeatedly actuates the pushbutton switch S4 or S5, without the motor vehicle being in the vicinity.

When a control signal is received by the transmitting and receiving unit 20, the counter reading currently stored in the counter 222 (with a start value equal to the random number) is used to generate the desired code word by encryption. The desired code word is subsequently compared with the received code word of the control signal.

If the two do not correspond, then the counter reading in the transmitting and receiving unit 20 is altered by being incremented or decremented analogously to the counter reading in the code signal generator 10. The new counter reading is used to generate a further desired code word by encryption. The new desired code word is therefore compared anew with the received code word. If correspondence is now identified, then the authentication is successful. Otherwise, the counter reading in the transmitting and receiving unit 20 is altered again and a further desired code word is generated.

If no correspondence is identified by the comparison unit 240, then this process is continued but, for the sake of security, only a limited number of encryption operations, is that is to say only a predetermined maximum number of comparison operations take place within which authentication must take place successfully. If authentication does not take place successfully, then the code signal generator 10 is deemed to be unauthorized.

A so-called capture range is obtained by virtue of the predetermined number of comparison operations. Within the capture range, authentication can still take place successfully if the code word of the control signal corresponds to the desired code word that is repeatedly generated anew. Outside the capture range, comparisons of the desired code word with the received code word no longer take place. The transmitting and receiving unit 20 and also the code signal generator 10 no longer run "synchronously" in that case.

To ensure that authentication is possible again, the anti-theft protection system must then be synchronized. This can be done by transmitting the question code signal. In this case, the synchronization data are on the one hand stored in the counter 222 of the transmitting and receiving unit 20 and, on the other hand, are transmitted to the counter 132 of the code signal generator 10 and stored there. The new synchronization data are then once again the starting point for encryption, that is to say for the generation of the code word and of the desired code word.

If the received code word of the control signal is not identified as authorized within the capture range, then the anti-theft protection system cannot, in the first instance, be controlled electronically any longer. To ensure that the user can nevertheless use his or her vehicle, the door locks are switched to mechanical actuation with a key. The user can then unlock the doors mechanically and enter the vehicle.

In order to start the vehicle, the user must release the electronic immobilizer. For this purpose, the ignition key is inserted by the user into the ignition lock and the key is turned. The ignition switch 210 thereby being actuated. A question-answer dialog subsequently takes place between the code signal generator 10 and the transmitting and receiving unit 20, the immobilizer being released in the event of the dialog progressing successfully.

During the question-answer dialog, new synchronization data are generated in the random number generator 211 and transmitted to the code signal generator 10 in the question code signal. Since the synchronization data are stored both in the transmitting and receiving unit 20 and in the code signal generator 10, synchronization takes place in this way. When control signals are transmitted in the future, successful authentication is now once more possible.

Synchronization can also take place by using a diagnostic unit that can be connected externally. In this case, both the code signal generator 10 and the transmitting and receiving unit 20 can be connected to the diagnostic unit. In the event of authorization being proved (for example by the inputting of a vehicle-specific PIN number), new synchronization data are stored both in the transmitting and receiving unit 20 and, via the inductive interfaces 200 and 100, in the memory of the code signal generator 10. Via the diagnostic unit, the transmitting and receiving unit 20 can also be requested to transmit the synchronization data via the inductive interfaces 200 and 100 to the code signal generator 10 so that they are stored there.

The transponder unit 100 and 130, the remote control unit 140 and 112 and also the encryption unit 111 are advantageously designed as an integrated circuit on a semiconductor chip (e.g. and Si semiconductor chip). The mechanical dimensions of the code signal generator 10 consequently become very small. All parts which are arranged as an integrated circuit on the semiconductor chip are enclosed by a dashed frame in FIG. 1. The pushbutton switches S4 and S5, the energy store 108, the resonant circuit 106 and 107 and also the optical or acoustic transmitting element 162 and the radio antenna 163 are arranged outside the semiconductor chip. It goes without saying that all these components are electrically connected to the semiconductor chip.

The question code signal or the response code signal is received or transmitted in the form of a radio-frequency magnetic field via the resonant circuit 106, 107. In this case, the clock signal for the sequence control unit 150 can be obtained from the magnetic field with the aid of the clock recovery unit 103.

The question code signal can also be used to transmit energy to the code signal generator 10. For this purpose, the voltage induced in the coil 106 is rectified in the rectifier upon reception of the question code signal. The resultant DC voltage can be used to charge the energy store 108 or to supply all the components of the code signal generator 10 directly with energy. If the energy store 108 is to a large extent charged, then the charging is temporarily ended. This is monitored by the voltage monitoring unit. If the energy in the energy store 108 has fallen below a threshold value, then the energy store 108 is charged again.

The question code signal, the response code signal and the control signal are digital signals in binary form. The logic states 0 and 1 of such signals have levels L (low) and H (high). The energy required for the code signal generator 10 may be contained in the question code signal or in separately transmitted energy signals. For the purpose of energy transmission, the question code signal advantageously has voltage amplitudes of greater than 0 V both in the H and in the L level.

The signals may be amplitude-modulated, frequency-modulated, or phase-modulated or be modulated using another kind of modulation. It is usual for the question code signal and the response code signal to be transmitted inductively at a carrier frequency of approximately 125 kHz and for the control signal to be transmitted by radio at a carrier frequency of approximately 433 MHz.

The control signal may also be transmitted optically or acoustically. It can also be transmitted simultaneously both by radio and optically. The control signal need not necessarily be transmitted in modulated form. In such a case, the control signal is fed via an oscillator (instead of the modulator 161) directly to the radio antenna 163 or to the optical or acoustic transmitting element 162.

It goes without saying that other carrier frequencies can also be used to transmit the signals in modulated form. The signals can also be transmitted in parallel at least two different carrier frequencies. The transmission power of the question code signal can be tailored to the energy requirement of the code signal generator 10. The range of the transmitted signals can also be set by way of the transmission power. The range can also be set by way of other parameters, such as transmission method, carrier frequency, etc.

Binary signals will be transmitted with a predetermined electrical signal waveform, such as, for example, NRZ, RZ or biphase format. The biphase format has turned out to be advantageous for the application of wireless data transmissions in automotive engineering. It is also referred to as the Manchester code. In this case, the signals with the binary values 0 and 1 are represented by pulses having the length T/2. A signal with the value 1 is transmitted by a pulse in the first half of the period T and a signal with the value 0 is transmitted by means of a pulse in the second half.

All of the transmitted signals can be extended by start bits, stop bit or parity bits. This makes the transmission more reliable. The signal waveform and the structure of a transmitted data word (protocol) are set by the protocol generator 112. The protocol generator 112 additionally adds the data obtained from the pushbutton interrogation unit 140 or the data register 133 to the code word generated in the encryption unit 111.

The memory 130 may comprise a plurality of $E^2PROMs$. For the sake of security, the secret code cannot be read out externally. The secret code can be overwritten only in the event of authorization having been proved. When authorization is proved, the switch S3 is closed by the sequence control unit 150 and a new secret code received by the resonant circuit 106, 107 is written to the secret code memory 131. As proof of authorization, that is to say in order to close the switch S3 and write a new secret code, it may be provided that a specific pushbutton switch S4 or S5 of the code signal generator 10 is actuated for example for a predetermined period of time or a number of times in succession in a predetermined rhythm.

It is advantageous for the question code signal merely to be a binary random number which is generated in the random number generator 211 of the transmitting and receiving unit 20 and has a length of 32 bits, for example, which is stored in the counters 222 and 132. The counter reading of the counter 132 is incremented or decremented by one when a pushbutton switch S4 or S5 is actuated.

User-specific or vehicle-specific data may be stored in the data register 133. Likewise, diagnostic data may be written to the data register 133 via the inductive interfaces 100 and 200 during operation of the vehicle. However, the code signal generator 10 must then be as close as possible to the transmitting and receiving unit 20. This is the case when the code signal generator 10 is arranged on the grip of the ignition key and the ignition key is inserted in the ignition lock and the coil 204 of the transmitting and receiving unit 20 is arranged around the ignition lock.

Diagnostic data, in particular fault data, are acquired continuously during operation of the motor vehicle by a vehicle-internal diagnostic unit (on-board diagnosis) and written via the inductive interfaces 100 and 200 to the data register 133. A central control station can retrieve these diagnostic data externally via the receiver 260 in the motor vehicle and via the inductive interfaces 100 and 200 from the memory 130 of the code signal generator 10. The diagnostic data can then be transmitted either via the inductive interfaces 100 and 200 or via the transmitter 160 of the code signal generator 10 in a wire-free manner to the central control station.

Such a central control station may be situated for example in a vehicle belonging to traffic supervision (police) which monitors the diagnostic data of vehicles traveling past with regard to adherence to limit values (such as impermissible high pollutant values in the exhaust gas).

Data are encrypted with an encryption algorithm in the encryption units 111 and 130. If the encryption algorithm is secret, that is to say it cannot be read out externally, then the secret code is not absolutely necessary. If, on the is other hand, the encryption algorithm is relatively easily accessible externally, then the secret code is required in order to encrypt data securely.

The encryption units 111 and 230 may be designed as hardware, as hard-wired feedback shift registers. The encryption units 111, 230 may also be designed as microprocessors or as cryptoprocessors.

The manner in which data are encrypted is not essential to the invention. During encryption, a plain text is mapped onto a cipher text (control signal, code signals) in the encryption unit with the aid of the encryption algorithm and, if appropriate, with the aid of the secret code. The inverse mapping is referred to as decryption. Different methods can be used for the encryption or decryption.

Cryptographic methods, such as e.g. symmetrical or asymmetrical methods, may also be used for the encryption or decryption. In the case of cryptographic methods, the encrypted data are decrypted again at the remote end so that they are present as plain text. For the authentication, however, it suffices if the data at both ends are just encrypted and the two results are compared with one another. In the event of correspondence, it is ensured that an authorized code signal generator 10 has transmitted a code word. For this purpose, it is possible to ascertain either whether the encryption algorithm or the secret key is identical at both ends or whether the received code word is correct. Decryption is not absolutely necessary, therefore.

In the case of the cryptographic methods, public keys or else secret keys (=secret code) can be used for the encryption and decryption. So-called cryptoprocessors are used for this purpose. All the encryption methods share the characteristic that "cracking" of the transmitted, encrypted signals by interception of the data communication and evaluation of the data is possible only with an untenably high outlay. Consequently, such encryption methods are preferably suitable for an anti-theft protection system of a motor vehicle.

The code signal generator 10 may be arranged for example on a key grip of a door or ignition key. Likewise, a so-called smart card is suitable for accommodating the code signal generator 10. A user can conveniently carry the code signal generator 10 with him, since it is designed to be very small. Depending on the requirement, the code signal generator 10 can have more or fewer pushbutton switches S4, S5. Thus, depending on the requirement, there may be a pushbutton switch for locking all of the doors, another pushbutton switch for unlocking just one door, a pushbutton switch for locking all of the doors, a pushbutton switch for transmitting an emergency call, a pushbutton switch for locking/unlocking the luggage compartment, a pushbutton switch for opening/closing the windows/sliding sunroof/folding top, a pushbutton switch for unlocking the doors of a building, a pushbutton switch for switching on the building lighting, a pushbutton switch for opening the garage, etc.

With the code signal generator 10 according to the invention, there is no need for a dedicated coding or encryption unit for generating the control signal. Both the transponder unit and the remote control unit access the same encryption unit 111.

The code signal generator 10 according to the invention can be used not only for an anti-theft protection system of a motor vehicle but also for other applications in which authentication with a question-answer dialog between two units (bidirectional communication) and unidirectional remote control take place.

The term "immobilizer" as used herein is to be understood to mean all apparatuses in the motor vehicle which can prevent the motor vehicle from being used. These apparatuses are enabled only when authentication has successfully taken place beforehand. An immobilizer may include, for example, an engine control unit, a stop valve for the fuel supply, a switch for switching on the battery, a transmission control unit, a switch for switching on the ignition circuit, a brake control unit, the steering, etc.

The term "transponder unit" as used herein is to be understood to mean an apparatus which receives a signal and, in response to this, automatically transmits a signal back.

The question code signal, the response code signal and the control signal are code signals which each have a code word. The code word is a binary coded signal having many bit positions. As a result of the encryption, the code word changes during each new encryption operation. The code word may be preceded or succeeded by a plurality of bits which may be required for secure data transmission. The code word is compared with a desired code word.

We claim:

1. A code signal generator for triggering a security unit, comprising:
    a transponder unit adapted to receive a question code signal from a stationary transmitting and receiving unit, to generate, in response, a response code signal based on the question code signal, and to transmit the response code signal to the transmitting and receiving unit for authentication, whereby a security unit is enabled upon a successful authentication;
    a transmitting unit independent of said transponder unit, said transmitting unit having a switching element, and being adapted to wirelessly transmit a control signal to the stationary transmitting and receiving unit upon actuation by said switching element; and
    a single signal generating unit connected to said transmitting unit and to said transponder unit for generating the control signal and the response code signal.

2. The code signal generator according to claim 1, which further comprises a control unit controlling said transponder unit and said transmitting unit in dependence on a received question code signal and the actuation of said switching element, respectively.

3. The code signal generator according to claim 1, wherein said transponder unit, said transmitting unit and said signal generating unit are circuits commonly integrated on a semiconductor chip.

4. The code signal generator according to claim 1, wherein said transponder unit includes a resonant circuit with a coil and a capacitor for inductively transmitting the response code signal and inductively receiving the question code signal.

5. The code signal generator according to claim 1, wherein said transmitting unit includes a modulator and a radio antenna for transmitting the control signal coming from said modulator and an RF oscillator.

6. The code signal generator according to claim 1, wherein said transmitting unit has an optical transmitter for optically transmitting the control signal.

7. The code signal generator according to claim 1, wherein the code signal generator includes a memory unit connected to said transponder unit, said memory unit being enabled for data to be written but disabled for data to be read from externally of the code signal generator.

8. The code signal generator according to claim 7, wherein synchronization data are stored in said memory unit, and the synchronization data are fed to said signal generating unit for generating one of the response code signal and the control signal, the synchronization data in the question code signal being transmitted to said code signal generator, and overwriting previously stored synchronization data.

9. The code signal generator according to claim 1, which further comprises a clock recovery unit for recovering a clock signal for said control unit from the received question code signal.

10. The code signal generator according to claim 1, wherein the stationary transmitting and receiving unit is integrated in a motor vehicle anti-theft protection system, and the security unit is an immobilizer of the motor vehicle.

11. The code signal generator according to claim 1, including a controller controlled in a remotely controlled manner upon transmission of said control signal.

12. In an anti-theft protection system of a motor vehicle, comprising:
    a transmitting and receiving unit stationary in a motor vehicle;
    a code signal generator for triggering a security unit of the anti-theft protection system, said code signal generator including a transponder unit adapted to receive a question code signal from said stationary transmitting and receiving unit, to generate, in response, a response code signal based on the question code signal according to a given algorithm, and to transmit the response code signal to the transmitting and receiving unit for authentication;
    a transmitting unit independent of said transponder unit, said transmitting unit having a switching element, and being adapted to wirelessly transmit a control signal to said transmitting and receiving unit upon actuation by said switching element; and
    said transmitting and receiving unit having a signal generating unit generating a desired code signal according to the given algorithm, wherein one of the received response code signal and the received control signal are compared with the desired code signal and wherein, if the response code signal or the control signal corresponds with the desired code signal at least to a large extent, an enable signal is generated for controlling a security unit in the motor vehicle.

* * * * *